US012435203B2

(12) United States Patent
Ray et al.

(10) Patent No.: US 12,435,203 B2
(45) Date of Patent: Oct. 7, 2025

(54) ADHESIVE COMPOSITION

(71) Applicant: Rohm and Haas Company, Collegeville, PA (US)

(72) Inventors: Himal H. Ray, Collegeville, PA (US); Edwin Aloysius Nungesser, Jr., Collegeville, PA (US); Miroslav Janco, Collegeville, PA (US); Edward E. La Fleur, Holland, PA (US)

(73) Assignee: Rohm and Haas Company, Collegeville, PA (US)

( * ) Notice: Subject to any disclaimer, the term of this patent is extended or adjusted under 35 U.S.C. 154(b) by 451 days.

(21) Appl. No.: 17/638,289

(22) PCT Filed: Aug. 28, 2020

(86) PCT No.: PCT/US2020/048473
§ 371 (c)(1),
(2) Date: Feb. 25, 2022

(87) PCT Pub. No.: WO2021/045973
PCT Pub. Date: Mar. 11, 2021

(65) Prior Publication Data
US 2022/0348802 A1 Nov. 3, 2022

Related U.S. Application Data

(60) Provisional application No. 62/895,265, filed on Sep. 3, 2019.

(51) Int. Cl.
*C09J 7/24* (2018.01)
*C08K 5/10* (2006.01)
*C08K 5/17* (2006.01)
*C09J 7/38* (2018.01)
*C09J 133/06* (2006.01)
*C09J 133/08* (2006.01)
*C09J 133/12* (2006.01)

(52) U.S. Cl.
CPC .................. *C08K 5/10* (2013.01); *C08K 5/17* (2013.01); *C09J 7/243* (2018.01); *C09J 7/385* (2018.01); *C09J 133/064* (2013.01); *C09J 133/08* (2013.01); *C09J 133/12* (2013.01); C09J 2301/302 (2020.08); C09J 2301/408 (2020.08); C09J 2423/106 (2013.01); C09J 2433/00 (2013.01)

(58) Field of Classification Search
None
See application file for complete search history.

(56) References Cited

U.S. PATENT DOCUMENTS

| | | | |
|---|---|---|---|
| 4,442,258 A | 4/1984 | Sunakawa et al. | |
| 5,270,380 A | 12/1993 | Adamson et al. | |
| 5,612,137 A | 3/1997 | Scholz | |
| 5,814,685 A * | 9/1998 | Satake | C09D 11/326 525/902 |
| 6,299,936 B1 | 10/2001 | Reck et al. | |
| 6,605,662 B2 * | 8/2003 | Zhao | C09D 151/003 526/201 |
| 7,070,051 B2 * | 7/2006 | Kanner | A61B 17/06133 206/460 |
| 7,829,626 B2 | 11/2010 | Chiou et al. | |
| 8,686,096 B2 | 4/2014 | Deetz et al. | |
| 10,465,086 B2 * | 11/2019 | Petrie | C09D 133/02 |
| 11,760,822 B2 | 9/2023 | Einsla et al. | |
| 2005/0032933 A1 | 2/2005 | Hermes et al. | |
| 2006/0235131 A1 | 10/2006 | Hughes | |
| 2010/0003442 A1 | 1/2010 | Even et al. | |
| 2010/0178500 A1 | 7/2010 | Wada et al. | |
| 2012/0077030 A1 | 3/2012 | Gerst et al. | |
| 2012/0157593 A1 | 6/2012 | Dotake et al. | |
| 2012/0214937 A1 | 8/2012 | Dube et al. | |
| 2014/0079947 A1 | 3/2014 | Tamura et al. | |
| 2017/0015958 A1 | 1/2017 | Rodrigues | |
| 2017/0088694 A1 | 3/2017 | Li et al. | |
| 2018/0301733 A1 | 10/2018 | Naito et al. | |
| 2020/0270483 A1 | 8/2020 | Chiba et al. | |

FOREIGN PATENT DOCUMENTS

| | | |
|---|---|---|
| EP | 0359562 A2 | 3/1990 |
| JP | S61-264077 A | 11/1986 |
| JP | 2020064889 A * | 4/2020 |
| WO | 2016/024729 A1 | 7/2015 |

OTHER PUBLICATIONS

Aldrich Data Sheet (Year: 2019).*
Machine translation of JP 2020064889 A (Year: 2020).*

* cited by examiner

*Primary Examiner* — Frank D Ducheneaux
(74) *Attorney, Agent, or Firm* — Boyle Fredrickson S.C.

(57) ABSTRACT

The present disclosure provides an adhesive composition. The adhesive composition contains (A) multi-stage latex polymer particles, (B) a linear diamine base, and (C) an ethoxylated surfactant. The (A) multi-stage latex polymer particles include (i) a first-stage polymer containing acrylic acid monomer and a first vinyl monomer, and (ii) a second-stage polymer containing a meth acrylic acid monomer and a second vinyl monomer, with the proviso that the second vinyl monomer is different than the meth acrylic acid monomer. The first-stage polymer is bound to the second-stage polymer.

16 Claims, No Drawings

ADHESIVE COMPOSITION

BACKGROUND

In the adhesive industry, acrylic polymers are used for the production of pressure sensitive adhesive (PSA) with adhesion properties suitable for labels and other applications. Continuing efforts are being made to develop polymers that exhibit improved long-term adhesion performance, such as shear, for example.

The art recognizes the need for an adhesive composition containing acrylic polymer that is suitable for use as a pressure sensitive adhesive. The art further recognizes the need for an adhesive composition that exhibits sufficient long-term adhesion performance for PSA applications.

SUMMARY

The present disclosure provides an adhesive composition. The adhesive composition contains (A) multi-stage latex polymer particles, (B) a linear diamine base, and (C) an ethoxylated surfactant. The (A) multi-stage latex polymer particles include (i) a first-stage polymer containing acrylic acid monomer and a first vinyl monomer, and (ii) a second-stage polymer containing a meth acrylic acid monomer and a second vinyl monomer, with the proviso that the second vinyl monomer is different than the meth acrylic acid monomer. The first-stage polymer is bound to the second-stage polymer.

The present disclosure also provides an article. The article includes a substrate and a coating on the substrate. The coating contains an adhesive composition. The adhesive composition contains (A) multi-stage latex polymer particles, (B) a linear diamine base, and (C) an ethoxylated surfactant. The (A) multi-stage latex polymer particles include (i) a first-stage polymer containing acrylic acid monomer and a first vinyl monomer, and (ii) a second-stage polymer containing meth acrylic acid monomer and a second vinyl monomer, with the proviso that the second vinyl monomer is different than the meth acrylic acid monomer. The first-stage polymer is bound to the second-stage polymer.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "adhesive composition" is a mixture of components that is capable of joining substrates of interest together under an application of heat and/or pressure. Nonlimiting examples of suitable adhesive compositions include pressure sensitive adhesive (PSA) compositions and a hot melt adhesive (HMA) compositions. A "pressure sensitive adhesive (PSA) composition" is a mixture of components that is capable of joining substrates of interest together under the application of pressure, without the need for heat. A "hot melt adhesive (HMA) composition" is a mixture of components that is capable of joining substrates of interest together under the application of heat, or more typically, the application of heat and pressure.

"Alkyl" and "alkyl group" refer to a saturated linear, cyclic, or branched hydrocarbon group. Nonlimiting examples of suitable alkyl groups include methyl, ethyl, n-propyl, i-propyl, n-butyl, t-butyl, i-butyl (or 2-methylpropyl), etc. In one embodiment, the alkyl group has from 1 to 20 carbon atoms.

"Alkenyl" or "alkenyl group" refer to a hydrocarbyl group containing at least one C=C double bond. Alkenyl groups may be linear, cyclic or branched. Nonlimiting examples of suitable alkenyl groups include ethenyl groups, n-propenyl groups, i-propenyl groups, n-butenyl groups, t-butenyl groups, i-butenyl groups, etc.

"Aralkyl" and "aralkyl group" refer to an organic radical derived from aromatic hydrocarbon by replacing one or more hydrogen atoms with an aryl group.

"Aryl" and "aryl group" refer to an organic radical derived from aromatic hydrocarbon by deleting one hydrogen atom therefrom. An aryl group may be a monocyclic and/or fused ring system, each ring of which suitably contains from 5 to 7, or from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl and the like.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Crosslinkable" and "curable" indicate that the polymer, before or after shaped into an article, is not cured or crosslinked and has not been subjected or exposed to treatment that has induced substantial crosslinking although the polymer comprises additive(s) or functionality that will effectuate substantial crosslinking upon subjection or exposure to such treatment (e.g., exposure to water, or drying).

"Crosslinked" and similar terms indicate that the polymer composition, before or after it is shaped into an article, has xylene or decalin extractables of less than or equal to 90 weight percent (i.e., greater than or equal to 10 weight percent gel content).

A "diene" is an unsaturated hydrocarbon containing two double bonds between carbon atoms. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene.

"Fabric" is a woven structure or a non-woven (such as knitted) structure formed from individual fibers or yarn.

"Fiber" and like terms refer to an elongated column of entangled filaments. Fiber diameter can be measured and reported in a variety of fashions. Generally, fiber diameter is measured in denier per filament. Denier is a textile term which is defined as the grams of the fiber per 9,000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers.

"Filament" and like terms refer to a single, continuous strand of elongated material having generally round cross-section and a length to diameter ratio of greater than 10.

A "halogen" is an element in IUPAC Group 17 of the Periodic Table of Elements, which includes fluorine (F), chlorine (Cl), bromine (Br), iodine (I), and astatine (At).

A "heteroatom" is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

The terms "hydrocarbyl" and "hydrocarbon" refer to substituents containing only hydrogen and carbon atoms, including branched or unbranched, saturated or unsaturated, cyclic, polycyclic or noncyclic species. Nonlimiting examples include alkyl-, cycloalkyl-, alkenyl-, alkadienyl-, cycloalkenyl-, cycloalkadienyl-, aryl-, and alkynyl-groups.

A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

A "latex polymer" is a polymeric compound prepared by aqueous emulsion polymerization. Latex polymers exist as particles suspended throughout a continuous aqueous medium, which is a stable dispersion.

"Nonwoven" refers to a web or a fabric having a structure of individual fibers or threads which are randomly interlaid, but not in an identifiable manner as is the case of a knitted fabric.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Substituted hydrocarbyl" and "substituted hydrocarbon" refer to a hydrocarbyl group that is substituted with one or more non-hydrocarbyl substituent groups. Nonlimiting examples of a non-hydrocarbyl substituent group include a heteroatom, heteroatom-containing moieties, oxygen-containing moieties (e.g., alcohol, acrylate, acrylic acid, aldehyde, carboxylic acid, ester, ether, ketone, and peroxide groups), and nitrogen-containing moieties (e.g., amide, amine, azo, imide, imine, nitrate, nitrile, and nitrite groups).

A "textile" is a flexible material composed of a network of natural fibers, artificial fibers, and combinations thereof. Textile includes fabric and cloth.

"Weight of the polymer" refers to the dry weight of the polymer.

"Woven" refers to a web or a fabric having a structure of individual fibers or threads which are interlaid in a pattern in an identifiable manner. A nonlimiting example of a woven fabric is a knitted fabric.

"Yarn" is a continuous length of twisted or otherwise entangled filaments that can be used in the manufacture of woven or knitted fabrics.

TEST METHODS

Flash point refers to the lowest temperature at which a volatile liquid can vaporize to form an ignitable mixture in air but will not continue to burn (compare to fire point). Flash point is measured in accordance with ASTM D 3278.

Glass transition temperature (Tg) is measured according to ASTM-D3418-15.

The Hydrophile-Lipophile Balance (HLB) of a surfactant is a measure of the degree to which the surfactant is hydrophilic or lipophilic. HLB is determined by calculating values for the different regions of the molecule, as described by William C. Griffin in "Classification of Surface-Active Agents by HLB," 1 Journal of the Society of Cosmetic Chemists 5, 311-26 (1949) and "Calculation of HLB Values of Non-Ionic Surfactants," 5 Journal of the Society of Cosmetic Chemists 4, 249-56 (1954), the contents of which are herein incorporated by reference.

Loop tack is measured in accordance with ASTM 6195-03, test method-A, against both a stainless steel substrate and a high density polyethylene (HDPE) substrate.

pH is measured in accordance with ASTM E70-07 (2015).

Shear is measured in accordance with the PSTC 107 method. The result is reported in hours.

Viscosity of the linear diamine base and the composition is measured at 25° C. using a Brookfield LV Viscometer with a #3 cylindrical spindle at 30 rotations per minute (RPM).

Weight average molecular weight (Mw) is measured using a gel permeation chromatography (GPC) system. Mw is calculated in accordance with the following Equation (1):

$$\overline{Mw} = \frac{\sum_{i}^{i}(Wf_i * M_i)}{\sum_{i} Wf_i} \quad \text{Equation (1)}$$

wherein Wfi is the weight fraction of the i-th component and Mi is the molecular weight of the i-th component. A sample is prepared in tetrahydrofuran (THF) at concentration of 0.1-0.2%, based on solids. The sample is allowed to dissolve on mechanical shaker overnight at room temperature (23-25° C.). Then, the sample solution is filtered using 0.45 µm PTFE filters. 100 uL of sample solution is injected into a size-exclusion chromatography (SEC) system. SEC separations are performed in a THF mobile phase at 1 mL per minute on a column set composed of two PLgel Mixed B columns calibrated using narrow Polystyrene standards (580 gram per mole to 6.5 million gram per mole) and fitted with a $1^{st}$ order calibration curve. The effluent is monitored using a Refractive index detector.

90° Peel is measured in accordance with PSTC 101, Test Method F. The result is reported grams per inch (g/in).

DETAILED DESCRIPTION

The present disclosure provides an adhesive composition. The adhesive composition contains (A) multi-stage latex polymer particles, (B) a linear diamine base, and (C) an ethoxylated surfactant. The (A) multi-stage latex polymer particles include (i) a first-stage polymer containing acrylic acid monomer and a first vinyl monomer, and (ii) a second-stage polymer containing a meth acrylic acid monomer and a second vinyl monomer, with the proviso that the second vinyl monomer is different than the meth acrylic acid monomer. The first-stage polymer is bound to the second-stage polymer.

In an embodiment, the adhesive composition is a pressure sensitive adhesive (PSA) composition.

A. Multi-Stage Latex Polymer Particles

The adhesive composition contains multi-stage latex polymer particles. The multi-stage latex polymer particles include (i) a first-stage polymer containing acrylic acid monomer and a first vinyl monomer, and (ii) a second-stage polymer containing a meth acrylic acid monomer and a second vinyl monomer, with the proviso that the second vinyl monomer is different than the meth acrylic acid monomer. The first-stage polymer is bound to the second-stage polymer.

A "multi-stage latex polymer particle" ("MSLPP") is a latex polymer in which the particles each includes a first-stage polymer and a second-stage polymer, with the first-stage polymer bound to the second-stage polymer. As used herein with respect to the MSLPP, the term "bound to" refers to a first-stage polymer and a second-stage polymer that are covalently bonded to each other, or are associated with each other in a core-shell structure with the first-stage polymer forming the core and the second-stage polymer forming the shell. The MSLPP is prepared in two or more polymerization stages. In one of the stages, an emulsion polymerization process is conducted to produce first-stage polymer particles. In a subsequent stage, an emulsion polymerization process is conducted in the presence of the first-stage polymer particles to form the second-stage polymer. In an embodiment, there is a period of time between the formation of the first-stage polymer and the formation of the second-stage polymer in which no detectable polymerization takes place. In the formation of the second-stage polymer, half or more of the second-stage polymer (by weight, based on the weight of the second-stage polymer) forms on the surfaces of the first-stage polymer particles, and the second-stage polymer binds to the first-stage polymer. The second-stage polymer encapsulates, or substantially encapsulates, the first-stage polymer particles. One or more additional polymerization stages are optionally conducted (i) before the formation of the first-stage polymer; and/or (ii) between the formation of the first-stage polymer and the second-stage polymer; and/or (iii) after the formation of the second-stage polymer; and/or (iv) a combination thereof.

i. First-Stage Polymer

The multi-stage latex polymer particles include a first-stage polymer containing acrylic acid monomer and a first vinyl monomer.

The first-stage polymer contains acrylic acid monomer. "Acrylic Acid Monomer" (or "AA") is a compound having the following Structure (1):

Structure (1)

The first-stage polymer contains a first vinyl monomer. A "vinyl monomer" is a compound having the following Structure (2):

Structure (2)

wherein $R^1$, $R^2$, $R^3$, and $R^4$ each is independently selected from hydrogen, a halogen, a hydrocarbyl, a substituted hydrocarbyl, an acrylic monomer, and combinations thereof.

Nonlimiting examples of suitable vinyl monomers include styrene (STY), α-methyl styrene, ethylene, ethylene esters, diener, vinyl acetate, vinyl neodecanoate, acrylonitrile (AN), (meth) acrylonitriles, meth(acrylic) acids (MAA), acrylic acids, (meth) alkyl acrylates, methacrylamides, acrylamides, butyl acrylate (BA), ethyl acrylate (EA), methyl methacrylate (MMA), allylmethacrylate (ALMA), (meth) hydroxyalkyl acrylates, divinylbenzene (DVB), 2-ethyl hexyl acrylate (EHA), and combinations thereof.

The first vinyl monomer is different than the acrylic acid monomer (AA). In other words, the first vinyl monomer is compositionally and/or structurally distinct from the AA.

In an embodiment, the first vinyl monomer is selected from EHA, MMA, and combinations thereof.

In an embodiment, the first-stage polymer contains, consists essentially of, or consists of (i) AA and (ii) the first vinyl monomer is selected from EHA, MMA, and combinations thereof.

In an embodiment, the first stage polymer contains, consists essentially of, or consists of (i) AA (ii) EHA, and (iii) MMA.

In an embodiment, the first-stage polymer has a weight average molecular weight, Mw, from 50,000 g/mol, or 84,000 g/mol, or 200,000 g/mol, or 300,000 g/mol, or 340,000 g/mol to 400,000 g/mol, or 500,000 g/mol, or 750,000 g/mol, or 1,000,000 g/mol. In another embodiment, the first-stage polymer has a weight average molecular weight, Mw, from 50,000 g/mol to 1,000,000 g/mol, or from 84,000 g/mol to 1,000,000 g/mol, or from 300,000 g/mol to 750,000 g/mol, or from 340,000 g/mol to 400,000 g/mol.

In an embodiment, the first-stage polymer contains from 0.1 wt %, or 0.5 wt %, or 1.0 wt % to 1.5 wt %, or 2.0 wt %, or 3.0 wt %, or 5.0 wt %, or 10.0 wt % polymerized units of acrylic acid monomer (AA), based on the dry weight of the first-stage polymer.

In an embodiment, the first-stage polymer contains from 90 wt %, or 95 wt %, or 97 wt %, or 98 wt %, or 98.5 wt % to 99 wt %, or 99.5 wt %, or 99.9 wt % polymerized units of the first vinyl monomer (such as EHA and/or MMA), based on the dry weight of the first-stage polymer.

In an embodiment, the first-stage polymer contains, consists essentially of, or consists of: (i) from 0.1 wt % to 10.0 wt %, or from 0.5 wt % to 5.0 wt %, or from 1.0 wt % to 2.0 wt % polymerized units of acrylic acid monomer (AA); and (ii) a reciprocal amount of polymerized units of the first vinyl monomer (such as EHA and/or MMA), or from 90.0 wt % to 99.9 wt %, or from 95.0 wt % to 99.5 wt %, or from 98.0 wt % to 99.0 wt % polymerized units of the first vinyl monomer, based on the dry weight of the first-stage polymer.

In an embodiment, the first-stage polymer contains, consists essentially of, or consists of: (i) from 0.1 wt % to 10.0 wt %, or from 0.5 wt % to 5.0 wt %, or from 1.0 wt % to 2.0 wt % polymerized units of acrylic acid monomer (AA); (ii) from 60 wt %, or 70 wt %, or 75 wt %, or 80 wt % to 83 wt %, or 85 wt %, or 90 wt % polymerized units of 2-ethyl hexyl acrylate monomer (EHA); and (iii) from 9 wt %, or 10 wt %, or 15 wt %, or 16 wt % to 19 wt %, or 20 wt %, or 25 wt %, or 30 wt % polymerized units of methyl methacrylate monomer (MMA), based on the dry weight of the first-stage polymer. In a further embodiment, the first-stage polymer has a weight average molecular weight, Mw, from 50,000 g/mol to 1,000,000 g/mol, or from 84,000 g/mol to 1,000,000 g/mol, or from 300,000 g/mol to 750,000 g/mol, or from 340,000 g/mol to 400,000 g/mol.

The aggregate of the (i) AA and (ii) first vinyl monomer amount to 100 wt % of the first-stage polymer.

The first-stage polymer may comprise two or more embodiments disclosed herein.

ii. Second-Stage Polymer

The multi-stage latex polymer particles include a second-stage polymer containing (i) a meth acrylic acid monomer; and (ii) a second vinyl monomer.

The second-stage polymer contains a meth acrylic acid monomer. A "Meth Acrylic Acid Monomer" (or "MAA") is a compound having the following Structure (3):

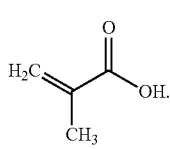

Structure (3)

The second-stage polymer includes a second vinyl monomer. The second vinyl monomer may be any vinyl monomer disclosed herein, other than MAA.

The second vinyl monomer is different than the MAA. In other words, the second vinyl monomer is compositionally and/or structurally distinct from the MAA.

The second vinyl monomer may be the same as or different than the first vinyl monomer in the first-stage polymer. In an embodiment, the second vinyl monomer of the second-stage polymer is the same as the first vinyl monomer of the first-stage polymer. When the second vinyl monomer of the second-stage polymer is the same as the first vinyl monomer of the first-stage polymer, the second vinyl monomer and the first vinyl monomer include an identical vinyl monomer, or an identical blend of vinyl monomers in an identical weight ratio. In another embodiment, the second vinyl monomer of the second-stage polymer is different than the first vinyl monomer of the first-stage polymer.

In an embodiment, the second vinyl monomer is selected from EHA, MMA, and combinations thereof. In a further embodiment, the second vinyl monomer is EHA.

In another embodiment, the second-stage polymer contains, consists essentially of, or consists of (i) MAA and (ii) the second vinyl monomer that is EHA.

In an embodiment, the soluble fraction of the MSLPP has a weight average molecular weight, Mw, from 200,000 g/mol, or 210,000 g/mol to 248,000 g/mol, or 250,000 g/mol, or 275,000 g/mol, or 300,000 g/mol, or 400,000 g/mol, or 500,000 g/mol. In another embodiment, the soluble fraction of the MSLPP has a weight average molecular weight, Mw, from 200,000 g/mol to 500,000 g/mol, or from 200,000 g/mol to 250,000 g/mol, or from 210,000 g/mol to 248,000 g/mol. Not wishing to be bound by any particular theory, it is believed that the Mw of the soluble fraction of the MSLPP, if equal or higher than 90% of the total polymer, is a measurement of the representative Mw of the entire polymer.

In an embodiment, the second-stage polymer contains from 0.1 wt %, or 1 wt %, or 2 wt %, or 4 wt % to 10 wt %, or 11 wt %, or 15 wt %, or 20 wt % polymerized units of MAA, based on the dry weight of the second-stage polymer.

In an embodiment, the second-stage polymer contains from 80 wt %, or 85 wt %, or 89 wt %, or 90 wt % to 96 wt %, or 98 wt %, or 99 wt %, or 99.9 wt % polymerized units of second vinyl monomer (such as EHA), based on the dry weight of the second-stage polymer.

In an embodiment, the second-stage polymer contains, consists essentially of, or consists of: (i) from 0.1 wt % to 20 wt %, or from 0.1 wt % to 10 wt %, or from 1 wt % to 10 wt % polymerized units of MAA; and (ii) a reciprocal amount of polymerized units of second vinyl monomer (such as EHA), or from 80 wt % to 99.9 wt %, or from 90 wt % to 99.9 wt %, or from 90 wt % to 99 wt % polymerized units of second vinyl monomer, based on the dry weight of the second-stage polymer. In a further embodiment, the soluble fraction of the MSLPP has a weight average molecular weight, Mw, from 200,000 g/mol to 500,000 g/mol, or from 200,000 g/mol to 250,000 g/mol, or from 210,000 g/mol to 248,000 g/mol.

In an embodiment, the second-stage polymer is void of, or substantially void of, acrylic acid monomer (AA).

In an embodiment, the second-stage polymer is void of, or substantially void of, methyl methacrylate monomer (MMA).

In an embodiment, the second-stage polymer is formed in the absence of a chain transfer agent (CTA). Nonlimiting examples of CTA include methyl-3-mercapto-propionate (MMP) and n-dodecyl mercaptan (n-DDM). A second-stage polymer formed in the presence of a CTA includes greater than 0 ppm residue of the CTA, based on the total dry weight of the second-stage polymer.

The second-stage polymer may comprise two or more embodiments disclosed herein.

The first-stage polymer is bound to the second-stage polymer. In an embodiment, the first-stage polymer is bound to the second-stage polymer by a crosslinking reaction between at least one monomer in the first-stage polymer and at least one monomer in the second-stage polymer.

In an embodiment, the MSLPP includes from 60 wt %, or 65 wt %, or 70 wt %, or 75 wt %, or 79 wt % to 90 wt %, or 95 wt % of the first-stage polymer, based on the total dry weight of the MSLPP.

In an embodiment, the MSLPP includes from 5 wt %, or 10 wt % to 21 wt %, or 25 wt %, or 30 wt %, or 35 wt %, or 40 wt % of the second-stage polymer, based on the total dry weight of the MSLPP.

In an embodiment, the MSLPP contains, consists essentially of, or consists of (i) from 60 wt % to 95 wt %, or from 75 wt % to 95 wt %, or from 79 wt % to 90 wt % of the first-stage polymer; and a reciprocal amount of the second-stage polymer, or from 5 wt % to 40 wt %, or from 5 wt % to 25 wt %, or from 10 wt % to 21 wt % of the second-stage polymer, based on the total dry weight of the MSLPP.

In an embodiment, the MSLPP has a glass transition temperature, Tg, from −54° C., or −50° C., or −45° C. to −44° C., or −40° C., or −35° C., or −30° C., or −20° C., or 0° C., or 10° C., or 20° C. In another embodiment, the MSLPP has a Tg from −54° C. to 20° C., or from −50° C. to 0° C., or from −54° C. to −30° C., or from −54° C. to −40° C., or from −54° C. to −44° C., or from −50° C. to −44° C.

In an embodiment, the MSLPP is formed using seed growth. During seed growth, a seed particle (either a copolymer seed particle or an oligomer seed particle) is included in the emulsion polymerization process conducted to produce the first-stage polymer. In an embodiment, there is a period of time between the formation of the seed particle and the formation of the first-stage polymer in which no detectable polymerization takes place. In the formation of the first-stage polymer, half or more of the first-stage polymer (by weight, based on the weight of the first-stage polymer) forms on the surfaces of the seed particles. The first-stage polymer encapsulates, or substantially encapsulates, the seed particles. Seed particles may be prepared as described in U.S. Pat. No. 8,686,096 (e.g., Examples 1 and 5 (col. 19 and 20)) and U.S. Pat. No. 7,829,626, the entire contents of which are incorporated herein by reference. In an embodiment, the seed particle is an oligomer seed particle containing an acrylic monomer. In a further embodiment, the seed particle is an acrylic oligomer seed (AOS) particle containing butyl acrylate, n-dodecyl mercaptan, methyl methacrylate (MMA), and methacrylic acid (MAA).

The MSLPP with (A) a first-stage polymer and (B) a second-stage polymer excludes single-phase polymers, such as polymers prepared in a single polymerization step. Instead, the MSLPP is structurally distinct from traditional single-phase polymers because the MSLPP includes two distinct polymers with different monomers (the (A) first-stage polymer containing AA and a first vinyl monomer, and the (B) second-stage polymer containing MAA and a second vinyl monomer) bound together, while traditional single-phase polymers include a single polymer with the same monomers distributed throughout the entire polymer chain.

The MSLPP may comprise two or more embodiments disclosed herein.

B. Linear Diamine Base

The adhesive composition contains a linear diamine base.

A "linear diamine base" is a compound having two amine groups, a linear structure, and a pH greater than 7.0. An "amine group" is a moiety having the following Structure (4):

Structure (4)

wherein $R^5$ and $R^6$ each is independently selected from hydrogen, a hydrocarbyl, and combinations thereof.

A nonlimiting example of a suitable amine group is an amino group, in which $R^5$ and $R^6$ each is a hydrogen in Structure (4).

Linear diamine base contains two, and only two amine groups. In other words, linear diamine base excludes compounds containing one amine group (a monoamine, such as products sold under the JEFFAMINE M Series, available from Huntsman), and compounds containing three or more amine groups (e.g., a triamine, such as products sold under the JEFFAMINE T Series, available from Huntsman).

Linear diamine base excludes compounds having a branched structure, such as branched diamines sold under the JEFFAMINE D Series and the JEFFAMINE ED Series, available from Huntsman.

In an embodiment, the linear diamine base is a polyetheramine. As used herein, a "polyetheramine" is a compound having the following Structure (5)

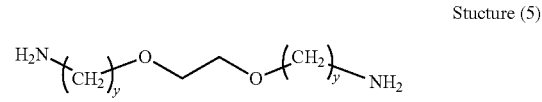

Structure (5)

wherein y is from 1, or 2 to 3, or 4, or 5, or 10.

In an embodiment, in Structure (5), y is from 1 to 10, or from 2 to 10, or from 1 to 3.

Nonlimiting examples of suitable linear diamine base that are polyetheramines include products sold under the JEFFAMINE EDR Series, including JEFFAMINE EDR-148 and JEFFAMINE EDR-176, available from Huntsman.

In an embodiment, the linear diamine base has the following Structure (6):

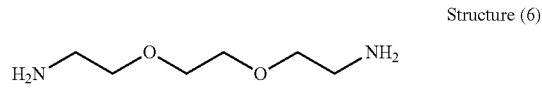

Structure (6)

A nonlimiting example of a linear diamine base having the Structure (6) is JEFFAMINE EDR-148, available from Huntsman.

In an embodiment, the linear diamine base has a pH from greater than 7.0, or 8.0, or 9.0, or 10.0, or 11.0, or 11.5 to 11.9, or 12.0, or 13.0, or 14.0. In another embodiment, the linear diamine base has a pH from 10.0 to 13.0, or from 11.0 to 12.0.

In an embodiment, the linear diamine base has a molecular weight from 30 g/mol, or 35 g/mol, or 37 g/mol to 44 g/mol, or 50 g/mol, or 75 g/mol, or 100 g/mol. In another embodiment, the linear diamine base has a molecular weight from 30 g/mol to 100 g/mol, or from 30 g/mol to 50 g/mol, or from 37 g/mol to 44 g/mol.

In an embodiment, the linear diamine base has a viscosity at 25° C. from 1 mm$^2$/s, or 5 mm$^2$/s, or 8 mm$^2$/s to 9 mm$^2$/s, or 10 mm$^2$/s, or 15 mm$^2$/s. In another embodiment, the linear diamine base has a viscosity at 25° C. from 1 mm$^2$/s to 15 mm$^2$/s, or from 5 mm$^2$/s to 10 mm$^2$/s, or from 8 mm$^2$/s to 9 mm$^2$/s.

In an embodiment, the linear diamine base has a flash point from 100° C., or 105° C., or 110° C., or 115° C. to 120° C., or 125° C., or 130° C. In another embodiment, the linear diamine base has a flash point from 100° C. to 130° C., or from 105° C. to 125° C., or from 105° C. to 120° C.

In an embodiment, the linear diamine base has the Structure (5), or further the Structure (6), and the linear diamine base has one, some, or all of the following properties: (i) a pH from 10.0 to 13.0, or from 11.0 to 12.0; and/or (ii) a molecular weight from 30 g/mol to 100 g/mol, or from 37 g/mol to 44 g/mol; and/or (iii) a viscosity at 25° C. from 1 mm$^2$/s to 15 mm$^2$/s, or from 8 mm$^2$/s to 9 mm$^2$/s; and/or (iv) a flash point from 100° C. to 130° C., or from 105° C. to 120° C.

The linear diamine base may comprise two or more embodiments disclosed herein.

C. Ethoxylated Surfactant

The adhesive composition contains an ethoxylated surfactant.

An "ethoxylated surfactant" is an alcohol ethoxylate having the following Structure (7):

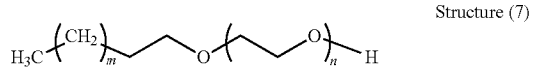

Structure (7)

wherein m is from 1 to 10, or 11, or 15, or 20, or 25; and n is from 1 to 2, or 3, or 4, or 5.

In an embodiment, in Structure (7), m is from 1 to 25, or from 1 to 10, or is 10.

In an embodiment, in Structure (7), n is from 1 to 5, or from 1 to 4.

An "ethoxylate" is a compound formed by reacting a fatty alcohol with ethylene oxide.

A nonlimiting example of a suitable ethoxylated surfactant is ethoxylated tridecyl alcohol, which m is equal to 10 in Structure (7). A nonlimiting example of an ethoxylated tridecyl alcohol is LUTENSOL TDA-8, available from BASF.

In an embodiment, the ethoxylated surfactant has a molecular weight from 400 g/mol, or 450 g/mol, or 500 g/mol to 550 g/mol, or 600 g/mol, or 700 g/mol, or 800 g/mol. In another embodiment, the ethoxylated surfactant has a molecular weight from 400 g/mol to 800 g/mol, or from 500 g/mol to 600 g/mol.

In an embodiment, the ethoxylated surfactant has a Hydrophile-Lipophile Balance (HLB) from 10, or 11, or 12 to 13, or 14, or 15. In another embodiment, the ethoxylated surfactant has an HLB from 10 to 15, or from 12 to 13.

In an embodiment, the ethoxylated surfactant is an ethoxylated tridecyl alcohol having one, or both of the following properties: (i) a molecular weight from 400 g/mol to 800 g/mol, or from 500 g/mol to 600 g/mol; and/or (ii) an HLB from 10 to 15, or from 12 to 13.

The ethoxylated surfactant may comprise two or more embodiments disclosed herein.

D. Optional Additive

In an embodiment, the adhesive composition contains (A) the MSLPP, (B) the linear diamine base, (C) the ethoxylated surfactant, and (D) one or more optional additive.

Nonlimiting examples of suitable additive include bases (such as ammonium hydroxide), plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, water, and combinations thereof.

In an embodiment, the adhesive composition contains a rheology modifier. A nonlimiting example of a suitable rheology modifier is a non-ionic urethane rheology modifier, such as ACRYSOL RM-2020, available from The Dow Chemical Company. In an embodiment, the adhesive composition contains from 0.01 wt %, or 0.05 wt %, or 0.10 wt % to 0.25 wt %, or 0.30 wt %, or 0.50 wt %, or 1.0 wt %, or 2.0 wt %, or 3.0 wt % rheology modifier, based on the total weight of the composition.

The optional additive may comprise two or more embodiments disclosed herein.

In an embodiment, the adhesive composition contains from 90 wt %, or 95 wt %, or 97 wt % to 99 wt % MSLPP, based on the total weight of the adhesive composition.

In an embodiment, the adhesive composition contains from 0.5 wt %, or 0.8 wt % to 2.0 wt %, or 3.0 wt %, or 4.0 wt %, or 5.0 wt % linear diamine base, based on the total weight of the adhesive composition.

In an embodiment, the adhesive composition contains from 0.01 wt %, or 0.05 wt %, or 0.09 wt % to 0.15 wt %, or 0.20 wt %, or 0.50 wt %, or 0.75 wt %, or 1.0 wt % ethoxylated surfactant, based on the total weight of the adhesive composition.

In an embodiment, the composition contains, consists essentially of, or consists of: (A) from 90 wt % to 99 wt %, or from 95 wt % to 99 wt %, or from 97 wt % to 99 wt % MSLPP; (B) from 0.5 wt % to 5.0 wt %, or from 0.8 wt % to 3.0 wt %, or from 0.8 wt % to 2.0 wt % linear diamine base; (C) from 0.01 wt % to 1.0 wt %, or from 0.05 wt % to 0.50 wt %, or from 0.09 wt % to 0.15 wt % ethoxylated surfactant; and (D) optionally, from 0.01 wt %, or 0.05 wt %, or 0.10 wt % to 0.25 wt %, or 0.30 wt %, or 0.50 wt %, or 1.0 wt %, or 2.0 wt %, or 3.0 wt % optional additive (such as a rheology modifier).

In an embodiment, the adhesive composition has a pH from greater than 7.0, or 7.5, or 8.0, or 8.3 to 9.8, or 10.0, or 11.0, or 12.0. In another embodiment, the adhesive composition has a pH from greater than 7.0 to 12.0, or from 8.0 to 10.0, or from 8.3 to 9.8.

In an embodiment, the adhesive composition has a shear greater than 500 hours, or greater than 1000 hours, or greater than 1500 hours, or greater than 1700 hours. In another embodiment, the adhesive composition has a shear from 500 hours, or 1000 hours, or 1500 hours, or 1700 hours to 3000 hours, or 3500 hours. In an embodiment, the adhesive composition has a shear greater than 1700 hours.

In an embodiment, the adhesive composition has one, some, or all of the following properties: (i) a pH from greater than 7.0 to 12.0, or from 8.0 to 10.0, or from 8.3 to 9.8; and/or (ii) a shear greater than 500 hours, or greater than 1000 hours, or greater than 1500 hours, or greater than 1700 hours; and/or (iii) a 90° peel strength (stainless steel) from 200 g/in, or 300 g/in, or 500 g/in, or 600 g/in, or 650 g/in to 900 g/in, or 1000 g/in, or 1500 g/in; and/or (iv) a 90° peel strength (HDPE) from 200 g/in, or 250 g/in, or 300 g/in to 450 g/in, or 500 g/in, or 750 g/in, or 1000 g/in; and/or (v) a loop tack (stainless steel) from 200 g/in, or 400 g/in, or 600 g/in, or 650 g/in to 800 g/in, or 900 g/in, or 1000 g/in, or 1500 g/in; and/or (vi) a loop tack (HDPE) from 200 g/in, or 300 g/in, or 350 g/in, or 360 g/in, or 400 g/in to 650 g/in, or 750 g/in, or 1000 g/in.

In an embodiment, the adhesive composition contains, consists essentially of, or consists of:

(A) from 90 wt % to 99 wt %, or from 95 wt % to 99 wt %, or from 97 wt % to 99 wt %, based on the total weight of the adhesive composition, of the MSLPP containing, consisting essentially of, or consisting of:

(i) from 60 wt % to 95 wt %, or from 75 wt % to 95 wt %, or from 79 wt % to 90 wt %, based on the total dry weight of the MSLPP, of the first stage polymer containing, consisting essentially of, or consisting of: (a) from 0.1 wt % to 10.0 wt %, or from 0.5 wt % to 5.0 wt %, or from 1.0 wt % to 2.0 wt % polymerized units of acrylic acid monomer (AA); (b) from 60 wt %, or 70 wt %, or 75 wt %, or 80 wt % to 83 wt %, or 85 wt %, or 90 wt % polymerized units of 2-ethyl hexyl acrylate monomer (EHA); and (c) from 9 wt %, or 10 wt %, or 15 wt %, or 16 wt % to 19 wt %, or 20 wt %, or 25 wt %, or 30 wt % polymerized units of methyl methacrylate monomer (MMA), based on the dry weight of the first-stage polymer, the first-stage polymer having a weight average molecular weight, from 50,000 g/mol to 1,000,000 g/mol, or from 84,000 g/mol to 1,000,000 g/mol, or from 300,000 g/mol to 750,000 g/mol, or from 340,000 g/mol to 400,000 g/mol;

(ii) from 5 wt % to 40 wt %, or from 5 wt % to 25 wt %, or from 10 wt % to 21 wt %, based on the total dry weight of the MSLPP, of the second-stage polymer containing, consisting essentially of, or consisting of: (a) from 0.1 wt % to 20 wt %, or from 0.1 wt % to 10 wt %, or from 1 wt % to 10 wt % polymerized units of meth acrylic acid monomer (MAA); and (b) from 80 wt % to 99.9 wt %, or from 90 wt % to 99.9 wt %, or from 90 wt % to 99 wt % polymerized units of second vinyl monomer (such as EHA), based on the dry weight of the second-stage polymer;

the soluble fraction of the MSLPP having a weight average molecular weight, Mw, from 200,000 g/mol to 500,000 g/mol, or from 200,000 g/mol to 250,000 g/mol, or from 210,000 g/mol to 248,000 g/mol;

the MSLPP having a glass transition temperature, Tg, from −54° C. to 20° C., or from −50° C. to 0° C., or from −54° C. to −30° C., or from −54° C. to −40° C., or from −54° C. to −44° C., or from −50° C. to −44° C.;

(B) from 0.5 wt % to 5.0 wt %, or from 0.8 wt % to 3.0 wt %, or from 0.8 wt % to 2.0 wt %, based on the total weight of the adhesive composition, of the linear diamine base having the Structure (5), or further the Structure (6), the linear diamine base having one, some, or all of the following properties: (i) a pH from 10.0 to 13.0, or from 11.0 to 12.0; and/or (ii) a molecular weight from 30 g/mol to 100 g/mol, or from 37 g/mol to 44 g/mol; and/or (iii) a viscosity at 25° C. from 1 mm²/s to 15 mm²/s, or from 8 mm²/s to 9 mm²/s; and/or (iv) a flash point from 100° C. to 130° C., or from 105° C. to 120° C.;

(C) from 0.01 wt % to 1.0 wt %, or from 0.05 wt % to 0.50 wt %, or from 0.09 wt % to 0.15 wt %, based on the total weight of the adhesive composition, of the ethoxylated surfactant that is an ethoxylated tridecyl alcohol having one, or both of the following properties: (i) a molecular weight from 400 g/mol to 800 g/mol, or from 500 g/mol to 600 g/mol; and/or (ii) an HLB from 10 to 15, or from 12 to 13;

(D) optionally, from 0.01 wt %, or 0.05 wt %, or 0.10 wt % to 0.25 wt %, or 0.30 wt %, or 0.50 wt %, or 1.0 wt %, or 2.0 wt %, or 3.0 wt %, based on the total weight of the adhesive composition, of the optional additive (such as a rheology modifier); and the adhesive composition has one, some, or all of the following properties: (i) a pH from greater than 7.0 to 12.0, or from 8.0 to 10.0, or from 8.3 to 9.8; and/or (ii) a shear greater than 500 hours, or greater than 1000 hours, or greater than 1500 hours, or greater than 1700 hours; and/or (iii) a 90° peel strength (stainless steel) from 200 g/in to 1500 g/in, or from 500 g/in to 1000 g/in, or from 650 g/in to 900 g/in; and/or (iv) a 90° peel strength (HDPE) from 200 g/in to 1000 g/in, or from 300 g/in to 750 g/in, or from 300 g/in to 450 g/in; and/or (v) a loop tack (stainless steel) from 200 g/in to 1500 g/in, or from 400 g/in to 1000 g/in, or from 650 g/in to 800 g/in; and/or (vi) a loop tack (HDPE) from 200 g/in to 1000 g/in, or from 300 g/in to 750 g/in, or from 350 g/in to 650 g/in.

It is understood that the sum of the components in each of the adhesive compositions disclosed herein, including the foregoing adhesive composition, yields 100 wt %.

The adhesive composition may comprise two or more embodiments disclosed herein.

In an embodiment, an article can be prepared that includes a substrate and the above-described adhesive composition. The substrate is in contact with the aqueous composition.

E. Article

The present disclosure provides an article. The article includes a substrate and a coating on the substrate. The coating contains an adhesive composition. The adhesive composition contains (A) multi-stage latex polymer particles, (B) a linear diamine base, and (C) an ethoxylated surfactant. The (A) multi-stage latex polymer particles include (i) a first-stage polymer containing acrylic acid monomer and a first vinyl monomer, and (ii) a second-stage polymer containing meth acrylic acid monomer and a second vinyl monomer, with the proviso that the second vinyl monomer is different than the meth acrylic acid monomer. The first-stage polymer is bound to the second-stage polymer.

The adhesive composition may be any adhesive composition disclosed herein.

The article includes a substrate. The adhesive composition is on at least one surface of the substrate. Nonlimiting examples of suitable substrates include film, sheets, fabric, cardboard and wood. In an embodiment, the composition forms a seal between the at least one surface of the substrate and at least one surface of another substrate.

The substrate is a continuous structure with two opposing surfaces.

In an embodiment, the article includes a first substrate and a second substrate. The coating containing the adhesive composition is between the first substrate and the second substrate. The first substrate and the second substrate may be the same or different. In an embodiment, the first substrate and the second substrate are the same, such that they have the identical compositions and identical structures.

In an embodiment, the first substrate and the second substrate are compositionally distinct and/or structurally distinct from one another.

In an embodiment, the coating containing the adhesive composition is applied to a surface of the first substrate. Nonlimiting examples of suitable application methods include brushing, pouring, spraying, coating, rolling, spreading, and injecting. The coating containing the adhesive composition is contacted with a surface of the second substrate.

In an embodiment, the coating containing the adhesive composition has a coat weight from 0.5 mil, or 0.6 mil, or 0.7 mil to 0.9 mil, or 1.0 mil. In another embodiment, the coating containing the adhesive composition has a coat weight from 0.5 mil to 1.0 mil, or from 0.7 mil to 0.9 mil.

In an embodiment, the adhesive composition is uniformly applied on a surface of the first substrate to form a coating, and then the coating is brought into contact with the second substrate. A "uniform application" is a layer of the composition that is continuous (not intermittent) across a surface of the substrate, and of the same, or substantially the same, thickness across the surface of the substrate. In other words, an adhesive composition that is uniformly applied to a substrate directly contacts the substrate surface, and the adhesive composition is coextensive with the substrate surface.

The adhesive composition and the first substrate are in direct contact with each other. The term "directly contacts," as used herein, is a layer configuration whereby a substrate is located immediately adjacent to an adhesive composition, or a coating, and no intervening layers, or no intervening structures, are present between the substrate and the adhesive composition, or the coating. The adhesive composition directly contacts a surface of the first substrate. In an embodiment, the coating directly contacts a surface of the second substrate.

In an embodiment, the substrate is a multilayer film, or a laminate, having a layer selected from a biaxially oriented polypropylene (BOPP) layer, a polyester layer, an ethylene-based polymer layer, a polyethylene terephthalate (PET) layer, and combinations thereof. In a further embodiment, the substrate contains a BOPP Layer.

In an embodiment, the first substrate is a PET film and the second substrate is a BOPP film. The PET film directly contacts the coating, and the BOPP film directly contacts the coating.

BOPP film has non-porous and non-polar surfaces, which makes it difficult to bond
BOPP film with conventional adhesive compositions. However, it was unexpectedly found that an article containing a substrate with a BOPP film in direct contact with a coating containing the present adhesive composition including (A) multi-stage latex polymer particles with (i) a first-stage polymer containing acrylic acid monomer and a first vinyl monomer, and (ii) a second-stage polymer containing meth acrylic acid monomer and a second vinyl monomer; (B) a linear diamine base; and (C) an ethoxylated surfactant, exhibits sufficient adhesion, as demonstrated by a shear greater than 500 hours. A shear of greater than 500 hours is advantageous in adhesive applications (such as labels) because it indicates that the label will adhere to an article (e.g., a plastic or glass bottle) in the label's original position on the article, for the life span of the article.

In an embodiment, the article contains substrate that is a BOPP film in direct contact with the coating containing the adhesive composition, and the article has one, some, or all of the following properties: (i) the coating containing the adhesive composition has a coat weight from 0.5 mil to 1.0 mil, or from 0.7 mil to 0.9 mil; and/or (ii) the adhesive composition has a pH from greater than 7.0 to 12.0, or from 8.0 to 10.0, or from 8.3 to 9.8; and/or (iii) the adhesive composition has a shear greater than 500 hours, or greater than 1000 hours, or greater than 1500 hours, or greater than 1700 hours; and/or (iv) a 90° peel strength (stainless steel) from 200 g/in to 1500 g/in, or from 500 g/in to 1000 g/in, or from 650 g/in to 900 g/in; and/or (v) a 90° peel strength (HDPE) from 200 g/in to 1000 g/in, or from 300 g/in to 750 g/in, or from 300 g/in to 450 g/in; and/or (vi) a loop tack (stainless steel) from 200 g/in to 1500 g/in, or from 400 g/in to 1000 g/in, or from 650 g/in to 800 g/in; and/or (vii) a loop tack (HDPE) from 200 g/in to 1000 g/in, or from 300 g/in to 750 g/in, or from 350 g/in to 650 g/in.

Nonlimiting examples of suitable articles include labels, signs, and combinations thereof.

The article may comprise two or more embodiments disclosed herein.

By way of example, and not limitation, some embodiments of the present disclosure will now be described in detail in the following Examples.

EXAMPLES

The monomers and chain transfer agents used in the examples are provided in Table 1 below.

TABLE 1

Monomers and Chain Transfer Agents (CTA)

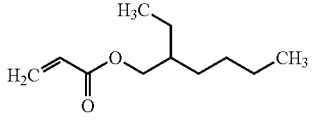

2-ethyl hexyl acrylate (EHA)

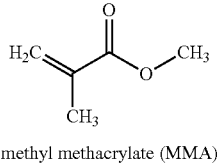

methyl methacrylate (MMA)

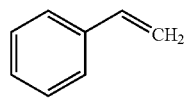

styrene (STY)

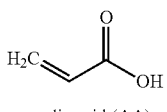

acrylic acid (AA)

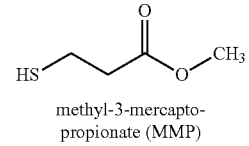

methyl-3-mercapto-propionate (MMP)

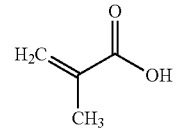

meth acrylic acid (MAA)

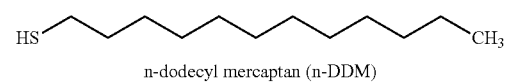

n-dodecyl mercaptan (n-DDM)

A. Comparative Sample 1

Comparative Sample 1 (CS 1) is an aqueous composition including single-stage latex polymer particles prepared by emulsion polymerization of 2-ethyl hexyl acrylate (EHA), methyl methacrylate (MMA), styrene (STY) and acrylic acid (AA). CS 1 is a copolymer containing 80.8 wt % EHA, 16.3 wt % MMA, 1.9 wt % STY, and 1 wt % AA, based on the total weight of the CS 1 copolymer.

CS 1 is prepared by forming a monomer mixture (CS ME 1) containing 80.8 wt % EHA, 16.3 wt % MMA, 1.9 wt % STY, and 1 wt % AA. Then, a homogenized mixture is prepared with the following components: the monomer mixture (CS ME 1), 22.2 wt % of deionized (DI) water, and 0.24 wt % of Siponate™ DS-4 (branched alkylbenzene sulfonate (22.5 wt % aq. solution, sodium dodecylbenzene-sulfonate)), 0.19 wt % Acrysol A-102 solution (having a solids content of 30 wt %, available from The Dow Chemical Company), 0.059 wt % sodium carbonate buffer, and 0.008 wt % Dequest™ 2016 solution (having a solids content of 33 wt % 1-hydroxyethylene-1,1,-diphsophonic acid sodium salt).

A glass kettle equipped with a stirrer, a heater, a reflux condenser, and a nitrogen spurge tube is provided. 53.2% of DI water is added to the kettle. The kettle content (53.2 wt % DI water and 0.004 wt % 4-hydroxy-Tempo), is blanketed with nitrogen while heating to 88° C. Once the kettle reaches a temperature of 88° C., Kettle buffer solution (1.05 g sodium carbonate with 26.3 g DI water) is added to the kettle, followed by 7.5 g rinse water. A kettle surfactant mixture solution (3.22 g of Siponate™ DS-4 and 45 g DI water) is added to kettle, followed by 7.5 g of DI water rinse.

To the kettle, 3 wt % of the homogenized mixture is added as a seed, followed by initial catalyst solution (5.55 g ammonium persulphate (APS) and 18.8 g DI water) is added, followed by rinse water. The calculated expected exotherm is less than 5° C. over several minutes. After the exotherm starts, the homogenized mixture (at a feed rate of 14.3 g/min) and co-feed catalyst solution (1.8 g of APS in 78.8 g of distilled water) (at a feed rate of 0.54 g/min) are fed into the kettle for the first 10 minutes of the feeds. After 10 minutes, the feeds are increased to 28.5 g/min for the homogenized mixture and 1.07 g/min for the co-feed catalyst, over 70 minutes. The reaction temperature is maintained 85-87° C. When the feeds are complete, all of the rinse (DI water used to clean the feed lines) is added. The reaction is held between 85-87° C. for 15 minutes, and then cooled to 75° C. over 15 minutes. At a temperature of 75° C., a promoter solution (0.027 g FeSO$_4$, 0.027 g VERSENE EDTA (ethylenediaminetetraacetic acid), 3 g DI water) is added to the kettle, followed by a 3 g rinse of DI water. Then, an oxidizer chase (10.65 g t-butyl hydroperoxide (t-BHP) in 52.5 g water) is started at a feed rate of 1.3 g/min, and a reluctant feed (5.63 g sodium formaldehyde sulfoxylate (SSF) in 67.5 g DI water) is started at a feed rate of 1.46 g/min over 50 minutes. During the chase, the reactor is cooled to below 50-60° C. over 50 minutes. At a reactor temperature of less than 55° C., a neutralizer (9.12 g ammonium hydroxide and 9 g DI water) feed is started at a feed rate of 1.81 g/min over 10 minutes. The batch is cooled to less than 40° C., and filtered through a 100 mesh filter bag.

B. Samples 2-9

Samples 2-9 each is an aqueous composition including multi-stage latex polymer particles prepared by emulsion polymerization.

A first monomer emulsion (ME 1) is prepared in a first flask. The components of the first monomer emulsion (ME 1) of Samples 2-9 are provided below in Table 2.

A second monomer emulsion (ME 2) is prepared in a second flask. The components of the second monomer emulsion (ME 2) of Samples 2-9 are provided below in Table 2.

An initiator emulsion (IE) is prepared in a separate vial by combining DI water (44 g) and ammonium persulfate (APS) (5.64 g). The IE is emulsified for 5 min with a homogenizer at 5,000 rpm.

A buffer solution (BSol) is prepared in a separate vial by combining DI water (10 g) and sodium carbonate (0.73 g).

To a kettle equipped with a stirrer, a heater, a reflux condenser, and a nitrogen purge tube is added 31.6 wt % DI water, 1.8 wt % 60 nm pre-form seed (supplied by The Dow Chemical Company), and 8.7 wt % 230 nm seed nm pre-form seed (supplied by The Dow Chemical Company). The addition of pre-form seed particles at the start of the reaction removes the variability in the nucleation step. For example, the polymerization rate and particle size can be easily controlled. Seeded polymerisations also give less reactor build up, reduced pebbling and give more stable latices. In addition, by carefully controlling the amount of seed used, it is possible to produce bimodal latices with reduced latex viscosity. The kettle contents are blanketed with nitrogen while being heated to 91° C. An initiator solution (containing 1.41 g APS in 17.5 g DI water) and the BSol are then added to the kettle, which is stirred for one minute. The temperature of the kettle is then set between 86-89° C., and ME 1 is fed into the kettle at a rate of 12.3 g/min for 10 minutes at a temperature of 88° C., and the IE is co-fed into the kettle at a rate of 0.32 g/min. The temperature is maintained at 86-89° C. and after 10 minutes the ME 1 feed rate is increased to 24.5 g/min and the co-feed of the IE is increased to 0.64 g/min. As soon as the ME 1 is completely added to the kettle, the ME 2 feed is immediately added for the remaining 70 minutes of feed. At the end of the feed, all of the DI water rinse is added to the kettle. The kettle is cooled to 75° C., and 10.00 grams of a 0.001% Fe$^{2+}$ solution (0.02 g FeSO$_4$0.01 g VERSENE EDTA, DI water) is added to the kettle. The residual monomers are then chased by feeding t-BHP solution (3.14 g in 30 g water) at a feed rate of 0.55 g/min and by feeding a SSF solution (2.17 g SSF in 30 g DI water) at a rate of 0.54 g/min over 1 hour. During the chase, the kettle is cooled to less than 50-60° C. The batch is cooled to less than 40° C., and filtered through a 50 mesh filter bag.

TABLE 2

Monomer Emulsion Components*

| | Sample 2 | Sample 3 | Sample 4 | Sample 5 | Sample 6 | Sample 7 | Sample 8 | Sample 9 |
|---|---|---|---|---|---|---|---|---|
| First Monomer Emulsion (ME 1) | | | | | | | | |
| DI water | 12.1 | 12.1 | 12.1 | 12.1 | 12.1 | 12.1 | 12.1 | 12.1 |
| 2-ethyl hexyl acrylate (EHA) | 63.4 | 68.4 | 73.4 | 73.4 | 73.4 | 73.4 | 73.4 | 73.4 |
| methyl methacrylate (MMA) | 14.6 | 14.6 | 14.6 | 14.6 | 14.6 | 14.6 | 14.6 | 14.6 |
| acrylic acid (AA) | 1.0 | 1.0 | 1.0 | 1.0 | 1.0 | 1.0 | 1.0 | 1.0 |

TABLE 2-continued

| | Monomer Emulsion Components* | | | | | | | |
|---|---|---|---|---|---|---|---|---|
| | Sample 2 | Sample 3 | Sample 4 | Sample 5 | Sample 6 | Sample 7 | Sample 8 | Sample 9 |
| Disponil FES-32[1] | 0.61 | 0.61 | 0.61 | 0.61 | 0.61 | 0.61 | 0.61 | 0.61 |
| sodium carbonate buffer | 0.035 | 0.035 | 0.035 | 0.035 | 0.035 | 0.035 | 0.035 | 0.035 |
| | Second Monomer Emulsion (ME 2) | | | | | | | |
| DI water | 12.1 | 12.1 | 12.1 | 12.1 | 12.1 | 12.1 | 12.1 | 12.1 |
| 2-ethyl hexyl acrylate (EHA) | 20 | 15 | 10 | 10 | 10 | 10 | 10 | 10 |
| meth acrylic acid (MAA) | 1 | 1 | 1 | 1 | 1 | 1 | — | — |
| acrylic acid (AA) | — | — | — | — | — | — | 1 | 1 |
| methyl-3-mercapto-propionate (MMP) | — | — | — | 0.15 | — | — | — | — |
| n-dodecyl mercaptan (n-DDM) | — | — | — | — | 0.15 | 0.33 | 0.15 | 0.33 |
| Disponil FES-32[1] | 0.2 | 0.2 | 0.2 | 0.2 | 0.2 | 0.2 | 0.2 | 0.2 |
| sodium carbonate buffer | 0.035 | 0.035 | 0.035 | 0.035 | 0.035 | 0.035 | 0.035 | 0.035 |

[1]Disponil FES-32 is an anionic surfactant containing sodium lauryl ether sulfate, available from BASF
*Amounts in Table 2 are in grams (g)

The resulting aqueous compositions including multi-stage latex polymer particles of Samples 2-9 each is provided in Table 3.

TABLE 3

| | Polymer Particles* | | | | | | | | |
|---|---|---|---|---|---|---|---|---|---|
| | CS 1 | Sample 2 | Sample 3 | Sample 4 | Sample 5^ | Sample 6@ | Sample 7@ | Sample 8@ | Sample 9@ |
| | First Stage | | | | | | | | |
| 2-ethyl hexyl acrylate (EHA) | 80.8 | 63.4 | 68.4 | 73.4 | 73.4 | 73.4 | 73.4 | 73.4 | 73.4 |
| methyl methacrylate (MMA) | 16.3 | 14.6 | 14.6 | 14.6 | 14.6 | 14.6 | 14.6 | 14.6 | 14.6 |
| acrylic acid (AA) | 1.0 | 1.0 | 1.0 | 1.0 | 1.0 | 1.0 | 1.0 | 1.0 | 1.0 |
| styrene (STY) | 1.9 | — | — | — | — | — | — | — | — |
| | Second Stage | | | | | | | | |
| 2-ethyl hexyl acrylate (EHA) | N/A | 20 | 15 | 10 | 10 | 10 | 10 | 10 | 10 |
| meth acrylic acid (MAA) | N/A | 1 | 1 | 1 | 1 | 1 | 1 | — | — |
| acrylic acid (AA) | N/A | — | — | — | — | — | — | 1 | 1 |
| Tg (° C.) | NM | NM | −44.06 | NM | −43.27 | −41.57 | −43.17 | −43.95 | −43.19 |
| First Stage Mw (g/mol) | NM | 392,000 | 340,000 | 356,000 | 395,000 | 374,000 | 307,000 | 382,000 | 411,000 |
| Second Stage Mw (g/mol)# | N/A | 248,000 | 248,000 | 210,000 | 298,000 | 300,000 | 262,000 | 230,000 | 280,000 |

*Amounts in Table 3 are in weight percent, based on the total dry-weight of the respective polymer particle
Second Stage Mw is measured on the soluble fraction of the final two-stage polymer.
^The methyl-3-mercapto-propionate (MMP) is used as a chain transfer agent (CTS) to form the second stage polymer of Sample 5, and does not appear as a monomer unit in the final polymer product. However, Sample 5 contains greater than 0 ppm MMP residue.
@The n-dodecyl mercaptan (n-DDM) is used as a chain transfer agent (CTS) to form the second stage polymer of Samples 6-9, and does not appear as a monomer unit in the final polymer product. However, Samples 6-9 contains greater than 0 ppm n-DDM residue.

C. Preparation of Adhesive Compositions

In addition to the polymer particles of Comparative Sample 1 (CS 1) and Samples 2-9 prepared as described above, the materials used to produce adhesive compositions are shown in Table 4 below.

TABLE 4

| Component | Specification | Source |
|---|---|---|
| LUTENSOLTDA-8 | ethoxylated surfactant; ethoxylated tridecyl alcohol ($C_{13}$) Hydrophile-Lipophile Balance (HLB) = 13; molecular weight = 550 g/mol | BASF |

TABLE 4-continued

| Component | Specification | Source |
|---|---|---|
| ACRYSOL RM-2020 | non-ionic urethane rheology modifier<br>solids content = 20 wt %; solvent = water | The Dow Chemical Company |
| JEFFAMINE D-230 | non-linear diamine base; polyetheramine<br>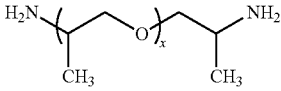<br>wherein x is from 2 to 3<br>viscosity (@ 25° C.) = 9.5 mm²/s;<br>flash point = 121° C.; pH (5% aqueous solution) = 11.7 | Huntsman |
| JEFFAMINE EDR-148 | linear diamine base; polyetheramine<br><br>viscosity (@ 25° C.) = 8 mm²/s;<br>flash point = 120° C.; pH = 11.6; molecular weight = 37 g/mol | Huntsman |
| ammonium hydroxide | NH₄OH, in a 28% solution | Fisher |

The polymer particles of Comparative Sample 1 (CS 1) and Samples 2-9 prepared as described above each is weighed into a plastic wide-mouth jar. To the jar is added wetting agent (LUTENSOL TDA-8) while continuously mixing with an overhead mixer for 10 minutes. Rheology modifier (ACRYSOL RM-2020) is then added to the jar and mixed for another 10 minutes. Then, the mixture is neutralized with ammonium hydroxide (NH₄OH) or a diamine base (JEFFAMINE D-230 or JEFFAMINE EDR-148).

The composition of each Comparative Sample Composition and Example Composition is provided in Table 5 below.

D. Coating

The Comparative Samples (CS) and Example Compositions (Ex) of Table 5 are coated onto a surface of a 1.2 mil-thick polyethylene terephthalate (PET) film with an anti-slip layer(a RAF HOSTAPHAN™ 2 PROKN 1S.sil film, available from Mitsubishi Polyester Film) using a 0.8 mil Bird™ applicator. Then, the coating is contacted with a biaxially oriented polypropylene (BOPP) film that has a thickness of 2.0 mil (supplied by Griff Papers).

The wet drawdowns are dried in a convection oven at 85° C. for a period of 5 minutes. The Comparative Samples and Example Compositions are coated at a coat weight of 20 grams per square meter (gsm). The Comparative Samples and Example Compositions are conditioned in a Constant Temperature and Humidity Room (CTR) (at 23° C. and 50% relative humidity) overnight prior to applications testing. The properties of the Comparative Samples and Example Compositions are provided in Table 5.

As shown in Table 5, CS 4 is a comparative composition contains (A) single-stage latex polymer particles (CS 1), (B) a linear diamine base (JEFFAMINE EDR-148), and (C) an ethoxylated surfactant (LUTENSOL TDA-8)—and lacks multi-stage latex polymer particles. CS 4 exhibits a shear of less than 500 hours (234 hours), indicating that articles with a coating containing the adhesive composition of CS 4 are unsuitable for article applications such as labels, which require sufficient adhesion between the label and a second article (such as a bottle).

As shown in Table 5, CS 6, CS 10, and CS 14 each is a comparative composition containing (A) multi-stage latex polymer particles with (i) a first-stage polymer containing acrylic acid (AA) and a first vinyl monomer; and a second stage polymer containing meth acrylic acid monomer (MAA) and a second vinyl monomer (EHA); (B) a non-linear diamine base (JEFFAMINE D-230), and (C) an ethoxylated surfactant (LUTENSOL TDA-8)—and lacks linear diamine base. CS 6, CS 10, and CS 14 each exhibits a shear of less than 500 hours (152.6 hours, 405.2 hours, and 174 hours, respectively), indicating that articles with a coating containing the adhesive composition of CS 6, CS 10, and CS 14 are unsuitable for article applications such as labels, which require sufficient adhesion between the label and a second article (such as a bottle).

CS 16-CS 18 each is a comparative composition containing (A) multi-stage latex polymer particles with (i) a first-stage polymer containing acrylic acid (AA) and a first vinyl monomer; and a second stage polymer formed with CTA (MMP or n-DDM) containing meth acrylic acid monomer (MAA) and a second vinyl monomer (EHA), (B) a linear diamine base (JEFFAMINE EDR-148), and (C) an ethoxylated surfactant (LUTENSOL TDA-8). CS 16-CS 18 each exhibits a shear of less than 500 hours (40.4 hours, 85.5 hours, and 23.4 hours, respectively), indicating that articles with a coating containing the adhesive composition of CS 16-CS 18 are unsuitable for article applications such as labels, which require sufficient adhesion between the label and a second article (such as a bottle).

TABLE 5

Adhesive Compositions

| | Polymer Particle (g) | JEFFAMINE D-230 (g) | JEFFAMINE EDR-148 (g) | NH$_4$OH (g) | LUTENSOL TDA-8 (g) | RM-2020 (g) | pH | Coat Weight (mil) | Shear (hr) | 90° Peel (g/in) SS | 90° Peel (g/in) HDPE | Loop Tack (g/in) SS | Loop Tack (g/in) HDPE |
|---|---|---|---|---|---|---|---|---|---|---|---|---|---|
| CS 2 | CS 1 200 g | — | — | — | 0.281 | 0.3736 | 8.23 | 0.8 | 109 | 746.41 | 465.733 | 607.786 | 410.04 |
| CS 3 | CS 1 200 g | 0.5779 | — | — | 0.241 | 0.3650 | 8.86 | 0.8 | 248.7 | 769.47 | 501.16 | 541.66 | 404.98 |
| CS 4 | CS 1 200 g | — | 0.2347 | — | 0.249 | 0.3978 | 8.43 | 0.8 | 234 | 830.22 | 473.32 | 551.79 | 334.11 |
| CS 5 | Sample 2 200 g | — | — | * | 0.239 | 0.3431 | 8.31 | 0.8 | 438.3 C | 320.34 | 311.84 | 552.81 | 331.68 |
| CS 6 | Sample 2 75 g | 1.1432 | — | — | 0.073 | 0.1567 | 8.64 | 0.8 | 152.6 | 865.66 | 425.235 | 622.67 | 480.92 |
| Ex 7 | Sample 2 75 g | — | 0.9993 | — | 0.074 | 0.1751 | 9.54 | 0.8 | >1700 | 787.191 | 425.235 | 734.04 | 607.47 |
| Ex 8 | Sample 2 75 g | — | 2.0069 | — | 0.085 | 0.1322 | 9.81 | 0.8 | >1700 | 654.86 | 333.95 | 759.47 | 369.67 |
| CS 9 | Sample 3 200 g | — | — | * | 0.206 | 0.3383 | 8.39 | 0.76 | 405.2 C | 348.69 | 326.01 | 592.49 | 323.18 |
| CS 10 | Sample 3 100 g | 1.7026 | — | — | 0.116 | 0.1881 | 8.57 | 0.76 | 308.8 | 842.87 | 379.67 | 592.29 | 561.92 |
| Ex 11 | Sample 3 100 g | — | 0.9666 | — | 0.131 | 0.1996 | 8.53 | 0.76 | >1700 | 761.88 | 382.20 | 678.35 | 546.73 |
| Ex 12 | Sample 3 100 g | — | 2.0344 | — | 0.128 | 0.2537 | 9.76 | 0.76 | >1700 | 686.04 | 273.28 | 759.47 | 364.58 |
| CS 13 | Sample 4 200 g | — | — | * | 0.23 | 0.3172 | 8.35 | 0.83 | 332.3 C | 382.71 | 331.68 | 626.51 | 326.01 |
| CS 14 | Sample 4 100 g | 1.4302 | — | — | 0.105 | 0.162 | 8.33 | 0.83 | 174 | 721.38 | 404.99 | 627.73 | 496.11 |
| Ex 15 | Sample 4 100 g | — | 0.825 | — | 0.108 | 0.1936 | 8.33 | 0.83 | >1700 | 850.47 | 415.11 | 713.79 | 501.17 |
| CS 16 | Sample 5 200 g | — | 1.49 | — | 0.22 | 0.4 | 8-10 | 0.76 | 40.4 | 392 A | 340 A | 595 A | 369 A |
| CS 17 | Sample 6 200 g | — | 1.42 | — | 0.27 | 0.38 | 8-10 | 0.77 | 85.5 | 401 A | 281 A | 550 A | 360 A |
| CS 18 | Sample 7 200 g | — | 1.39 | — | 0.21 | 0.43 | 8-10 | 0.76 | 23.4 | 434 A | 348 A | 647 A | 389 A |
| CS 19 | Sample 8 200 g | — | 1.48 | — | 0.25 | 0.39 | 8-10 | 0.76 | 113 | 315 A | 262 A | 477 A | 337 A |
| CS 20 | Sample 9 200 g | — | 2.19 | — | 0.24 | 0.47 | 8-10 | 0.77 | 7.9 | 320 A | 264 A | 496 A | 278 A |

C = cohesive failure
A = adhesive failure
*Ammonium hydroxide (NH$_4$OH) is added in an amount sufficient to adjust the pH of the composition to the target pH.

CS 19 and CS 20 each is a comparative composition containing (A) multi-stage latex polymer particles with (i) a first-stage polymer containing acrylic acid (AA) and a first vinyl monomer; and a second stage polymer formed with CTA (MMP or n-DDM) containing acrylic acid monomer (AA) and a second vinyl monomer (EHA), (B) a linear diamine base (JEFFAMINE EDR-148), and (C) an ethoxylated surfactant (LUTENSOL TDA-8). The second-stage polymer of CS 19 and CS 20 lacks meth acrylic acid monomer (MAA). CS 19 and CS 20 each exhibits a shear of less than 500 hours (113 hours and 7.9 hours, respectively), indicating that articles with a coating containing the adhesive composition of CS 19 and CS 20 are unsuitable for article applications such as labels, which require sufficient adhesion between the label and a second article (such as a bottle).

Applicant unexpectedly found that adhesive compositions (Ex 7, Ex 8, Ex 11, Ex 12, and Ex 15) containing (A) multi-stage latex polymer particles with (i) a first-stage polymer containing acrylic acid (AA) and a first vinyl monomer; and a second stage polymer containing meth acrylic acid monomer (MAA) and a second vinyl monomer (EHA); (B) a linear diamine base (JEFFAMINE EDR-148), and (C) an ethoxylated surfactant (LUTENSOL TDA-8) advantageously exhibit a high shear of at least 500 hours, as shown in Table 5. Consequently, articles with a coating containing the adhesive composition of Ex 7, Ex 8, Ex 11, Ex 12, or Ex 15 are suitable for article applications such as labels, which require sufficient adhesion between the label and a second article (such as a bottle).

Conventional adhesive applications typically demonstrate an inverse relationship between shear and peel properties (peel strength and loop tack). In other words, as shear increases for typical adhesive compositions, peel strength and loop tack decrease. However, Applicant unexpectedly found that adhesive compositions (Ex 7, Ex 8, Ex 11, Ex 12, and Ex 15) containing (A) multi-stage latex polymer particles with (i) a first-stage polymer containing acrylic acid (AA) and a first vinyl monomer; and a second stage polymer containing meth acrylic acid monomer (MAA) and a second vinyl monomer (EHA); (B) a linear diamine base (JEFFAMINE EDR-148), and (C) an ethoxylated surfactant (LUTENSOL TDA-8) advantageously exhibit a high shear of at least 500 hours, while maintaining a suitable 90° peel strength and loop tack for article applications (and, in some instances, exhibiting an improvement in 90° peel strength and loop tack). For instance, a comparison of Ex 15 (containing MSLPP Sample 4, linear diamine base, and ethoxylated surfactant) and CS 14 (containing MSLPP Sample 4 and ethoxylated surfactant, but no linear diamine base), shows that Ex 15 exhibits a shear (greater than 1700 hours) that is greater than 9 times the shear of CS 14 (174 hours), while also advantageously exhibiting a higher 90° peel strength and loop tack (for both stainless steel and HDPE substrates) than CS 14.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. An adhesive composition comprising
   (A) multi-stage latex polymer particles comprising:
      (i) a first-stage polymer consisting of
         acrylic acid monomer; and
         a first vinyl monomer consisting of 2-ethyl hexyl acrylate and methyl methacrylate;
      (ii) a second-stage polymer bound to the first-stage polymer, the second-stage polymer consisting of methacrylic acid monomer; and
         a second vinyl monomer consisting of 2-ethyl hexyl acrylate;
   (B) a linear diamine base; and
   (C) an ethoxylated surfactant.

2. The adhesive composition of claim 1, wherein the multi-stage latex polymer particles consist of:
   (i) the first-stage polymer consisting of
      from 0.1 wt % to 10 wt %, based on the dry weight of the first-stage polymer, polymerized units of the acrylic acid monomer;
      the first vinyl monomer consisting of 2-ethyl hexyl acrylate,-and methyl methacrylate;
   (ii) the second-stage polymer consisting of
      from 0.1 wt % to 10 wt %, based on the dry weight of the second-stage polymer, polymerized units of the methacrylic acid monomer.

3. The adhesive composition of claim 1, wherein the first stage polymer has a weight average molecular weight, Mw, from 340,000 g/mol to 400,000 g/mol; and
   the second stage polymer has a weight average molecular weight, Mw, from 200,000 g/mol to 250,000 g/mol.

4. The adhesive composition of claim 1, wherein the multi-stage latex polymer particles have a glass transition temperature, Tg, from −50° C. to 0° C.

5. The adhesive composition of claim 1, wherein the linear diamine base is a polyetheramine.

6. The adhesive composition of claim 1, wherein the linear diamine base has a Structure (6)

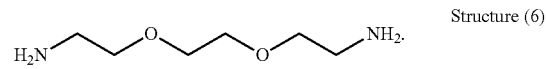

Structure (6)

7. The adhesive composition of claim 1, wherein the ethoxylated surfactant comprises ethoxylated tridecyl alcohol.

8. The adhesive composition of claim 1 comprising:
   (A) from 90 wt % to 99 wt % of the multi-stage latex polymer particles;
   (B) from 0.1 wt % to 1 wt % of the linear diamine base; and
   (C) from 0.01 wt % to 1 wt % of the ethoxylated surfactant.

9. The adhesive composition of claim 1, wherein the adhesive composition has a shear from 500 hours to 3000 hours.

10. An article comprising a substrate in contact with the adhesive composition of claim 1.

11. An article comprising:
   a substrate;
   a coating on the substrate, the coating comprising an adhesive composition comprising
   (A) multi-stage latex polymer particles comprising
      (i) a first-stage polymer consisting of
         acrylic acid monomer;
         a first vinyl monomer consisting of 2-ethyl hexyl acrylate and methyl methacrylate, the first stage polymer having a weight average molecular weight, Mw, from 340,000 g/mol to 400,000 g/mol; and
      (ii) a second-stage polymer bound to the first-stage polymer, the second-stage polymer consisting of methacrylic acid monomer;
         a second vinyl monomer consisting of 2-ethyl hexyl acrylate, the second stage polymer having a weight average molecular weight, Mw, from 200,000 g/mol to 250,000 g/mol;
   (B) a linear diamine base; and
   (C) an ethoxylated surfactant.

12. The article of claim 11, wherein the linear diamine base is a polyetheramine.

13. The article of claim 11, wherein the ethoxylated surfactant comprises ethoxylated tridecyl alcohol.

14. The article of claim 11, wherein the coating has a shear from 500 hours to 3000 hours.

15. The article of claim 11, wherein the substrate comprises a biaxially oriented polypropylene film, and the article has a 90° Peel (stainless steel) from 200 g/in to 1000 g/in.

16. The article of claim 11, wherein the substrate comprises a biaxially oriented polypropylene film, and the article has a loop tack (HDPE) from 200 g/in to 1000 g/in.

* * * * *